United States Patent
Antony et al.

(10) Patent No.: US 9,171,040 B2
(45) Date of Patent: Oct. 27, 2015

(54) METHODS, SYSTEMS, AND COMPUTER PROGRAM PRODUCTS FOR OPTIMIZING QUERY EVALUATION AND PROCESSING IN A SUBSCRIPTION NOTIFICATION SERVICE

(75) Inventors: JaiPaul K. Antony, Highland, NY (US); John B. Diamond, Poughkeepsie, NY (US); Scott P. Monheimer, Highland, NY (US); Michael D. Williams, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 971 days.

(21) Appl. No.: 11/539,919

(22) Filed: Oct. 10, 2006

(65) Prior Publication Data

US 2008/0086445 A1 Apr. 10, 2008

(51) Int. Cl.
*G06F 17/30* (2006.01)

(52) U.S. Cl.
CPC ...... *G06F 17/3046* (2013.01); *G06F 17/30507* (2013.01)

(58) Field of Classification Search
CPC ..................... G06F 17/30442; G06F 17/30507
USPC .......................................................... 707/610
See application file for complete search history.

(56) References Cited

U.S. PATENT DOCUMENTS

| | | | |
|---|---|---|---|
| 6,338,055 B1 | 1/2002 | Hagmann et al. | |
| 6,405,191 B1 | 6/2002 | Bhatt et al. | |
| 6,449,618 B1* | 9/2002 | Blott et al. | 707/101 |
| 6,487,548 B1 | 11/2002 | Leymann et al. | |
| 6,496,831 B1* | 12/2002 | Baulier et al. | 707/101 |
| 6,631,496 B1* | 10/2003 | Li et al. | 715/200 |
| 6,662,195 B1* | 12/2003 | Langseth et al. | 1/1 |
| 6,681,220 B1 | 1/2004 | Kaplan et al. | |
| 7,313,554 B2* | 12/2007 | Chen et al. | 707/3 |
| 7,383,253 B1* | 6/2008 | Tsimelzon et al. | 707/3 |
| 2002/0016786 A1* | 2/2002 | Pitkow et al. | 707/3 |
| 2002/0023104 A1* | 2/2002 | Satyavolu et al. | 707/501.1 |
| 2003/0223408 A1 | 12/2003 | Chen et al. | |
| 2003/0236856 A1* | 12/2003 | Bird et al. | 709/217 |
| 2004/0001498 A1 | 1/2004 | Chen et al. | |
| 2004/0167864 A1* | 8/2004 | Wang et al. | 707/1 |
| 2004/0260683 A1* | 12/2004 | Chan et al. | 707/3 |
| 2004/0267769 A1* | 12/2004 | Galindo-Legaria et al. | 707/100 |

(Continued)

OTHER PUBLICATIONS

USPTO, First Action Interview Pilot Program, Mar. 24, 2008.*
Nick Parlante, Binary Trees, 2001, Article #110 in the Stanford CS Education Library.*

(Continued)

*Primary Examiner* — James Trujillo
*Assistant Examiner* — Kurt Mueller
(74) *Attorney, Agent, or Firm* — Cantor Colburn LLP; William A. Kinnaman, Jr.

(57) ABSTRACT

A method, system, and computer program product for optimizing query evaluation and processing services in a subscription notification system are provided. The method includes determining hierarchical relationships among a set of subscription queries received from subscription client systems. The hierarchical relationships are determined by identifying subscription queries that are subsets of corresponding other subscription queries in the set. The method also includes creating at least one subscription query at a notification source, the at least one subscription query corresponding to one or more selected subscription queries in the set and including any corresponding subsets.

17 Claims, 4 Drawing Sheets

(56) References Cited

U.S. PATENT DOCUMENTS

| | | | |
|---|---|---|---|
| 2005/0071322 A1* | 3/2005 | Chen et al. | 707/3 |
| 2005/0086469 A1* | 4/2005 | Dunagan et al. | 713/163 |
| 2005/0208941 A1* | 9/2005 | Ordille et al. | 455/435.1 |
| 2005/0209990 A1* | 9/2005 | Ordille et al. | 707/1 |
| 2005/0210062 A1* | 9/2005 | Ordille et al. | 707/103 R |
| 2007/0005725 A1* | 1/2007 | Morris | 709/218 |
| 2007/0011155 A1* | 1/2007 | Sarkar | 707/5 |
| 2007/0136244 A1* | 6/2007 | MacLaurin et al. | 707/3 |
| 2008/0109481 A1* | 5/2008 | Catanzariti et al. | 707/104.1 |

OTHER PUBLICATIONS

"Binary search tree." Wikipedia, The Free Encyclopedia. Aug. 11, 2009, 10:54 UTC. Aug 11, 2009 <http://en.wikipedia.org/w/index.php?title=Binary_search_tree&oldid=307339666>.*

Self-adjusting binary search trees, Daniel Dominic Sleator, Journal of the ACM (JACM), vol. 32, Issue 3 (Jul. 1985), pp. 652-686.*

Wikipedia contributors. "AVL tree." Wikipedia, The Free Encyclopedia. Wikipedia, The Free Encyclopedia, Sep. 22, 2006. Web. Aug. 9, 2010.*

* cited by examiner

METHODS, SYSTEMS, AND COMPUTER PROGRAM PRODUCTS FOR OPTIMIZING QUERY EVALUATION AND PROCESSING IN A SUBSCRIPTION NOTIFICATION SERVICE

BACKGROUND OF THE INVENTION

The present disclosure relates generally to subscription notification services and, in particular, to methods, systems, and computer program products for optimizing query evaluation and processing in a subscription notification service.

Subscription notification services are implemented over a communications network, e.g., as a Web service by a service provider entity. Subscriptions facilitate ongoing information requests based upon a topic of interest to a subscriber. Notifications (also referred to as messages and alerts) inform the subscriber when the criteria specified the subscription has been met such as the change in state of a resource within a management system. A notification source system that produces the information and services the subscriptions typically uses query filters for determining when to generate a notification when the aforementioned action meets the criteria specified in the filter.

With the growing popularity of these subscription notification services, some notification source systems are turning to notification brokers for providing a portion of these services. In this model, the subscribing entity subscribes to the notification broker system which, in turn, subscribes to the notification source system. The subscriptions are created by the notification broker on behalf of the subscribers, and the notification source then services the subscriptions for the notification broker.

Oftentimes, subscription notification systems that involve processing large volumes of subscription requests can become inefficient in that numerous subscription queries presented to a notification source may be redundant; that is, multiple subscribers are requesting the same information, which can cause needless backlogs at the notification source. Processing large quantities of requests, including those that are redundant, can negatively impact the quality and response times regarding the subscription request processing and the resulting notifications.

What is needed, therefore, is a subscription notification service that eliminates, or substantially reduces, the redundancies in subscription requests, as well as optimizes the way in which they are processed at the time of an event or incident that needs to be evaluated against the criteria specified by one or more subscriptions.

BRIEF SUMMARY OF THE INVENTION

Embodiments of the invention include methods, systems, and computer program products for optimizing query evaluation and processing in a subscription notification service. The method includes determining hierarchical relationships among a set of subscription queries received from subscription client systems. The hierarchical relationships are determined by identifying subscription queries that are subsets of corresponding other subscription queries in the set. The method also includes creating at least one subscription query at a notification source. The subscription query corresponds to one or more selected subscription queries in the set and which also includes any corresponding subsets.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

In accordance with exemplary embodiments, query optimization and processing services are provided. The query optimization and processing services manages subscription queries in a manner that eliminates, or substantially reduces, the redundancies in subscription requests. Query optimization is facilitated by determining subset/superset relationships for subscription queries. The determination may be implemented, e.g., via a classification tree that is generated for subjects, e.g., topics, root items, classes, etc. Alternatively, the determination may be implemented, for example, using Structured Query Language (SQL) based queries by examining predicates or by examining Xpath queries for topics. These techniques are provided for purposes of illustration. It will be understood, however, that any suitable technique for determining these relationships may be utilized in order to realize the advantages of the invention.

Figure 1:
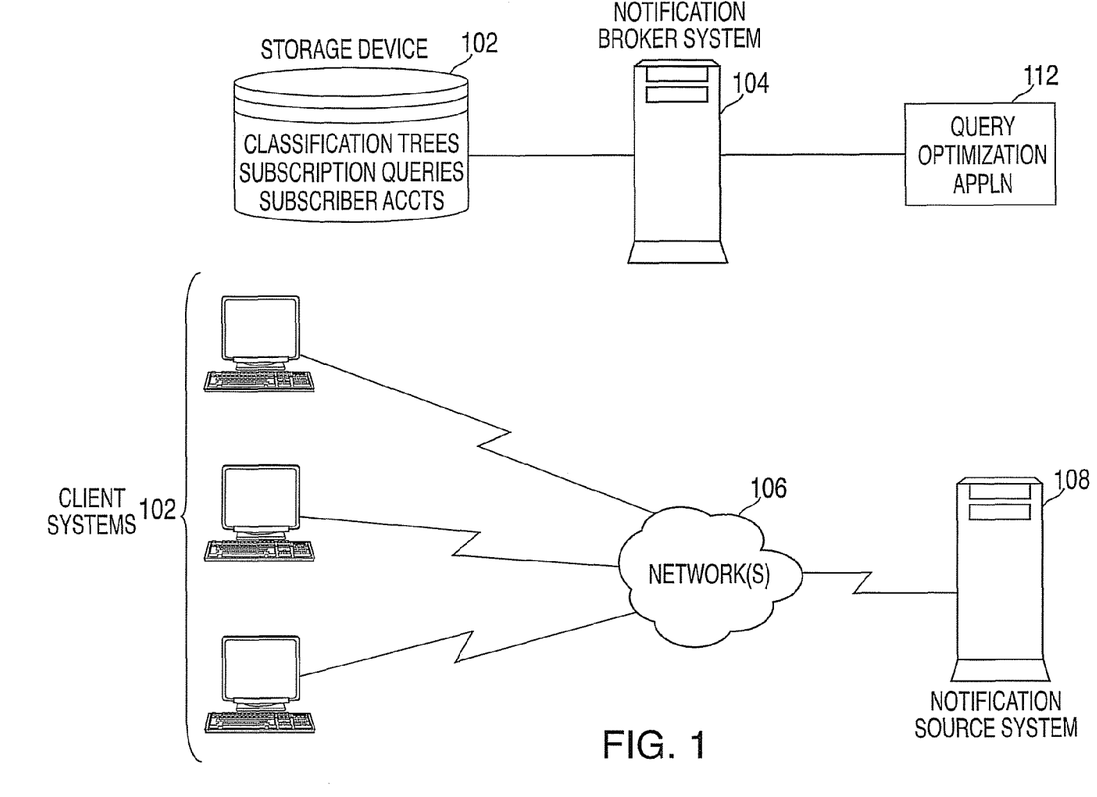
FIG. 1 is a diagram depicting a system upon which the query optimization services may be implemented in exemplary embodiments.

Turning now to FIG. 1, a system for implementing the query optimization and processing services will now be described in accordance with exemplary embodiments. The system of FIG. 1 includes a plurality of subscriber client systems 102 in communication with a notification broker system 104 over one or more network(s) 106. Also included in the system of FIG. 1 is a notification service provider system 108 (also referred to herein as "notification source system") in communication with the notification broker system 104 over one or more networks (e.g., networks 106).

In exemplary embodiments, the notification broker system 104 is an intermediary subscription/notification service provider that provides subscription notification services to subscriber client systems 102. Notification broker system 104 also provides subscription-related services to the notification service provider system 108 as described herein.

Client systems 102 are operated by users at one or more geographic locations who request (e.g., subscribe to) notification services. Each of client systems 102 may be implemented using a general-purpose computer executing a computer program for carrying out the processes described herein. Clients may include, e.g., Web services, network-based entities, and server-based resources. Clients may include any application process (i.e., autonomic resource manager) that is interested in the event specified in the subscriptions filter criteria. While only three client systems 102 are shown in the system of FIG. 1, it will be understood that many client systems 102 may be implemented in order to realize the advantages of the subscription evaluation and processing services.

Each of notification service provider system 108 and notification broker system 104 may be implemented using one or more servers operating in response to a computer program stored in a storage medium accessible by the server(s). The notification broker system 104 may operate as a network server (e.g., a web server) to communicate with the client systems 102 and notification service provider system 108. The notification broker system 104 handles sending and receiving information to and from the client systems 102 and notification service provider system 108 and can perform associated tasks. The notification broker system 104 executes one or more applications (e.g., query optimization application 112) to provide the services described herein.

The notification broker system 104 is in communication with a storage device 110. Storage device 110 may be implemented using memory contained in the notification broker system 104 or it may be a separate physical, logical, or virtual device. In exemplary embodiments, the storage device 110 is in direct communication with the notification broker system 104 (via, e.g., cabling). However, other network implementations may be utilized. For example, storage device 110 may be logically addressable as a consolidated data source across a distributed environment that includes one or more networks 106. Information stored in the storage device 110 may be retrieved and manipulated via the notification broker system 104. Storage device 110 stores a variety of information for use in implementing the query evaluation and processing services. As shown in FIG. 1, storage device 110 stores classification trees and/or SQL-based classifiers, subscription queries (e.g., optimal subscription queries), and subscription accounts. In exemplary embodiments, an optimal subscription query refers to one or more subscription queries that, collectively, are predicted will produce a minimal number of relevant messages without redundancies. Subscription accounts may include information regarding subscribers of the services (e.g., identification information, notification means, such as email addresses, etc., for subscriber client systems 102).

Network(s) 106 may be any type of known network including, but not limited to, a wide area network (WAN), a local area network (LAN), a global network (e.g. Internet), a virtual private network (VPN), and an intranet. The network(s) 106 may be implemented using a wireless network or any kind of physical network implementation known in the art. A client system 102 may be coupled to the notification broker system 104 through multiple networks (e.g., intranet and Internet) so that not all client systems 102 are coupled to the notification broker system 104 through the same network. One or more of the client systems 102 and the notification broker system 104 may be connected to the network 106 in a wireless fashion.

As indicated above, the query evaluation and processing services are implemented by determining hierarchical relationships among a set of subscription queries received from subscription client systems 102. The determination is implemented by identifying subscription queries that are subsets of a specified subscription query in the set. For example, a subscription query that is received may be classified by subset/superset relationships with existing subscription queries for a given topic. A classification scheme, such as a binary classification scheme may be used for classifying the information. It will be understood by those skilled in the art that other classification schemes may be utilized for implementing the query evaluation processes described herein. Thus, the binary classification scheme described herein is provided for illustrative purposes only and is not to be construed as limiting in scope. Once the classification tree is established, an optimal subscription query may be generated at a notification source for one or more specified subscription queries that incorporate the subsets.

Figure 2:
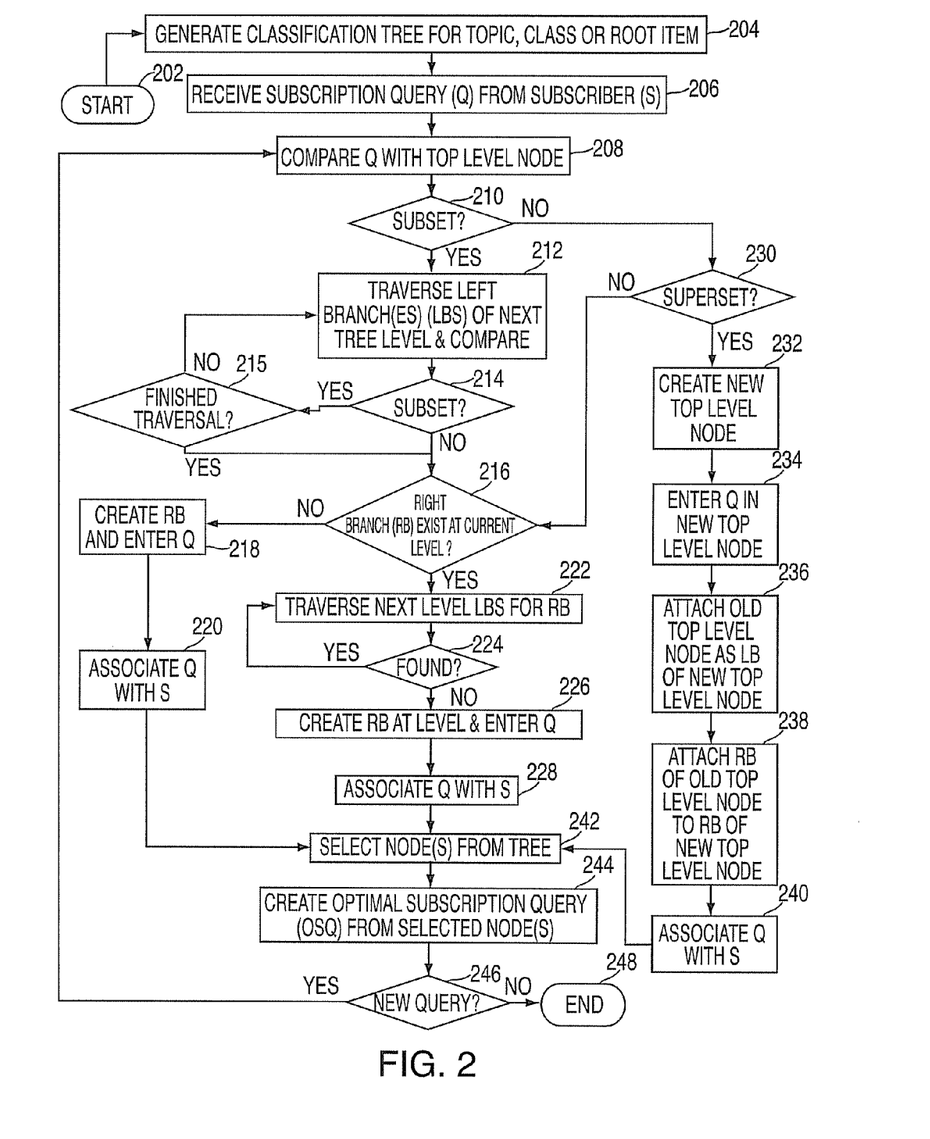
FIG. 2 is a flow diagram describing a process for creating an optimal subscription query via the query optimization services in exemplary embodiments.
Figure 3:
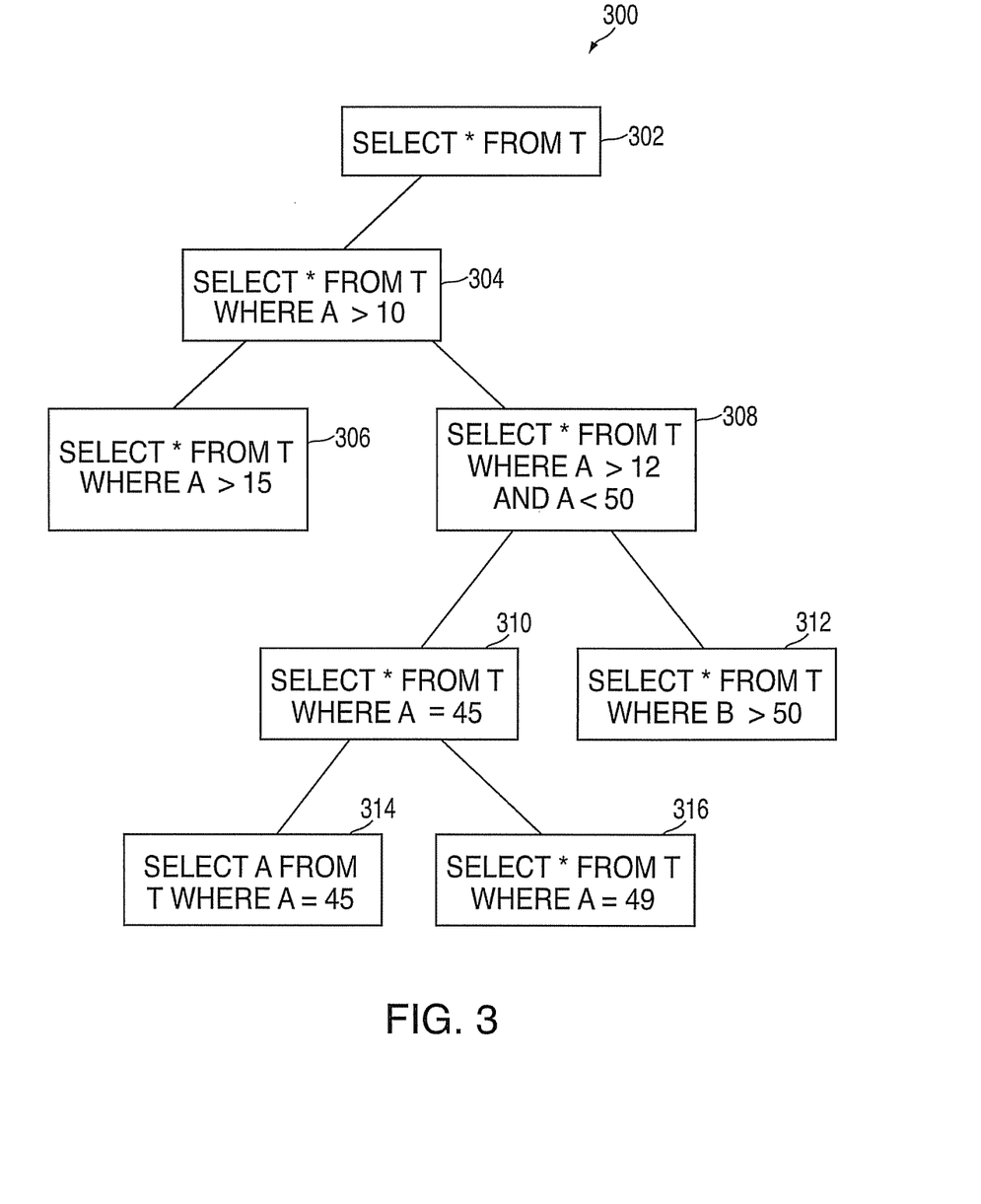
FIG. 3 is a sample binary classification tree created for a topic, class, or root item used in implementing the query optimization services in exemplary embodiments.

Turning now to FIG. 2, a process for creating an optimal subscription query via the query optimization services will now be described in exemplary embodiments. The process starts at step 202 where a classification tree (e.g., binary classification tree) is generated for a given subject (e.g., topic, class, root item, etc.) by the query evaluation application 112 at step 204. A sample binary classification tree 300 is shown in FIG. 3 for illustrative purposes. The binary classification tree 300 of FIG. 3 represents a series of SQL-based subscription queries. As shown in FIG. 3, binary classification tree 300 includes five levels comprised of nodes 302-316 presented in a hierarchical format. The top node 302 is situated at the highest level of the binary classification tree 300. Each of the five levels includes one or more nodes. Each node may be a parent node that includes a left branch (e.g., nodes 302, 304, 308, 310) and may alternatively include both a left and right branch (e.g., nodes 304, 308, 310). A node that does not include a branch is a leaf node (e.g., nodes 306 and 312). Each left node of a specified level (e.g., node 306) is a subset of a parent node (e.g., node 304) at the next higher level from which the nodes(s) branch. Each node contains a subscription query and each subscription query provided in a given left node is determined to be a subset of a subscription query provided in a respective parent node. The binary classification tree 300 is modified as new subscription queries are received and processed by the query evaluation application 112 as described herein. The binary classification tree 300 and others may be stored in storage device 110 of FIG. 1.

At step 206, the notification broker system 104 receives a new subscription query from a subscriber client system 102. The new subscription query is processed as described in steps 208-240 of FIG. 2. This processing will now be described in exemplary embodiments.

At step 208, the subscription query is compared to the top level node (e.g., node 302 of FIG. 3) of the binary classification tree. It is determined from the comparison whether the subscription query is a subset of a query specified in the top level node at step 210.

If the subscription query is determined to be a subset of a query specified in the top level node, the query evaluation application 112 traverses the left branch of the next tree level (e.g., the level comprising node 304) and compares the subscription query with the query provided in the node (e.g., node 304) that comprises the left branch of the top node at step 212.

Again, it is determined whether the subscription query is a subset of the left branch node (e.g., node 304) at step 214. Similar techniques as described above may be used in this determination. If the subscription query is determined to be a subset of the left branch node, it is determined whether the traversal is completed at step 215 (i.e., no lower level nodes exist in the tree). If the traversal has not completed at step 215, the process returns to step 212. Otherwise, if the query is not a subset of a current level node at step 214, or alternatively, if the traversal has completed at step 215, the process then proceeds to step 216.

At step 216, it is determined whether a right branch exists for current level (i.e., the level at which the parent node is found). If not, a right branch for the parent node is created at step 218 and the subscription query is entered in the node of the newly created right branch. At step 220, the subscription query is associated with the subscriber client system 102 which provided the subscription query (from step 206). This association may be implemented via the subscriber accounts stored in storage device 110 of FIG. 1. The process then continues at step 242 as described further herein.

Returning to step 216, if it is determined that a right branch does exist for the current level, the left branch of the next level of the classification tree is traversed in order to find a right branch. If a right branch has not been found at the current level, the next level (lower than the current level) is traversed at step 222. The process described in steps 222 and 224 is repeated until a node is found at a level which does not have a right branch. A right branch is then created at the level for the node at step 226 and the subscription query is entered in a node at the right branch. The subscription query is associated with the subscriber client system that provided the subscription query at step 228 and the process continues at step 242 as described further herein.

Returning to step 210, if the subscription query is not determined to be a subset of the top level node, it is next determined whether the subscription query is a superset of the top level node at step 230. If not, the process continues at step 216 as shown in the flow diagram of FIG. 2. If, however, the subscription query is determined to be a superset of the query provided in the top level node at step 230, a new top level node is created for the classification tree at step 232. The subscription query is entered into the new top level node at step 234. The old top level node is attached as a left branch of the new top level node at step 236. If existing, a right branch of the old top level node is attached as a right branch of the new top level node at step 238. At step 240, the subscription query is associated with the subscriber client system 102 that provided the subscription query (from step 206). The process continues at step 242.

The query evaluation system 112 selects one or more of the nodes in the classification tree at step 242. This determination may be made based upon, e.g., policy decisions, such as the ability of the notification source 108 to service subscriptions, the ability of the broker 104 to service subscriptions, and the cost of sending a notification from the notification source 108 to the broker 104 that no client system 102 is interested in receiving. For example, if the notification broker 104 creates a few wide ranging queries, it runs the risk of causing a lot of messages to be generated that no client system 102 is interested in receiving. In exemplary embodiments, the selection of the node(s) are determined based upon a minimal number of relevant messages that is expected will be obtained via execution of the identified selection.

These one or more selected nodes are used to create an optimal subscription query (i.e., one or more queries) at step 244. The optimal subscription query includes all of the query elements provided in the selected node(s), as well as all of those query elements contained in subscription queries captured in nodes that are children of the selected node(s) (i.e., by virtue of the subset relationships). This optimal subscription query is transmitted to the notification service provider system 108 for execution. Thus, the optimal subscription query may include an aggregation of two or more subscription queries that are subsets of the optimal subscription query. In this manner, redundancy of subscription query executions can be substantially eliminated. Any node in the binary classification tree may be selected for generating an optimal subscription query. For example, node 308 at level three of the binary classification tree 300 of FIG. 3 may be selected for the optimal subscription query. In this example, the optimal subscription query generated would include all of the query elements contained in node 308 as well as those contained in subordinate nodes 310-316 (by virtue of the subset relationships).

At step 246, it is determined whether a new subscription query has been received from a subscription client system 102. If not, the process ends at step 248. Otherwise, the process returns to step 208 as shown in the flow diagram of FIG. 2 and as described above.

As indicated above, and as shown in FIG. 3, the subset/superset relationships may be determined for SQL-based queries via examination and comparison of SQL expressions (e.g., SELECT clause and WHERE predicate). In particular, the query optimization application 112 examines the SELECT clauses of the two queries to determine if the fields selected in one query are a subset of the other query. If this first subset test succeeds, the query optimization application 112 proceeds to examine the WHERE predicates of the filters.

For a comparison of two queries to determine if the subset relationship exists, each column constraint must be examined one by one. In each case, the column of the subset query must include a smaller or equal range of values. The subset query may have more AND constraints than the super query but not the reverse. The superset query may have more OR constraints than the subset query but not the reverse. If none of the pervious evaluations return a false value, then a comparison of the included columns in the result set can be made. The subset query must include every column that the superset contains in the SELECT portion of the query.

If a new subscription request has a query filter that is a subset of an existing subscription, then the query optimization application 112 creates an internal record of the new subscription (i.e., no new node is created in the classification tree 300). The internal record may be part of the subscriber account record stored in storage device 110. The internal record associates the subscription client system 102, or subscriber, with the subscription query that is represented as a node in the classification tree 300. The query optimization application 112 then uses these subset relationships to construct a minimal number of efficient subscriptions at the notification source (i.e., notification source system 108).

As indicated above, one process utilized for determining subset/superset relationships for topics may be comparing XPath queries. The comparison of XPaths may be done on an element-by-element basis in the element hierarchy and may take into account attribute filters and wildcards. It will be appreciated that other techniques for determining subset/superset relationships may be used.

The notification broker 104 receives results from the notification source system 108 in response to execution of the optimal subscription query generated in FIG. 2. Each message result set (i.e., results of implementation of the optimal subscription query) may be used as input to a subset or more exclusive query as opposed to evaluating each query independently. Since subset relationships have been pre-established via the classification tree 300, the evaluations of subsequent queries may be applied to the result set of the parent superset rather than a larger data set, thereby providing efficiencies in the message evaluation process. These features will now be described in FIG. 4.

Figure 4:
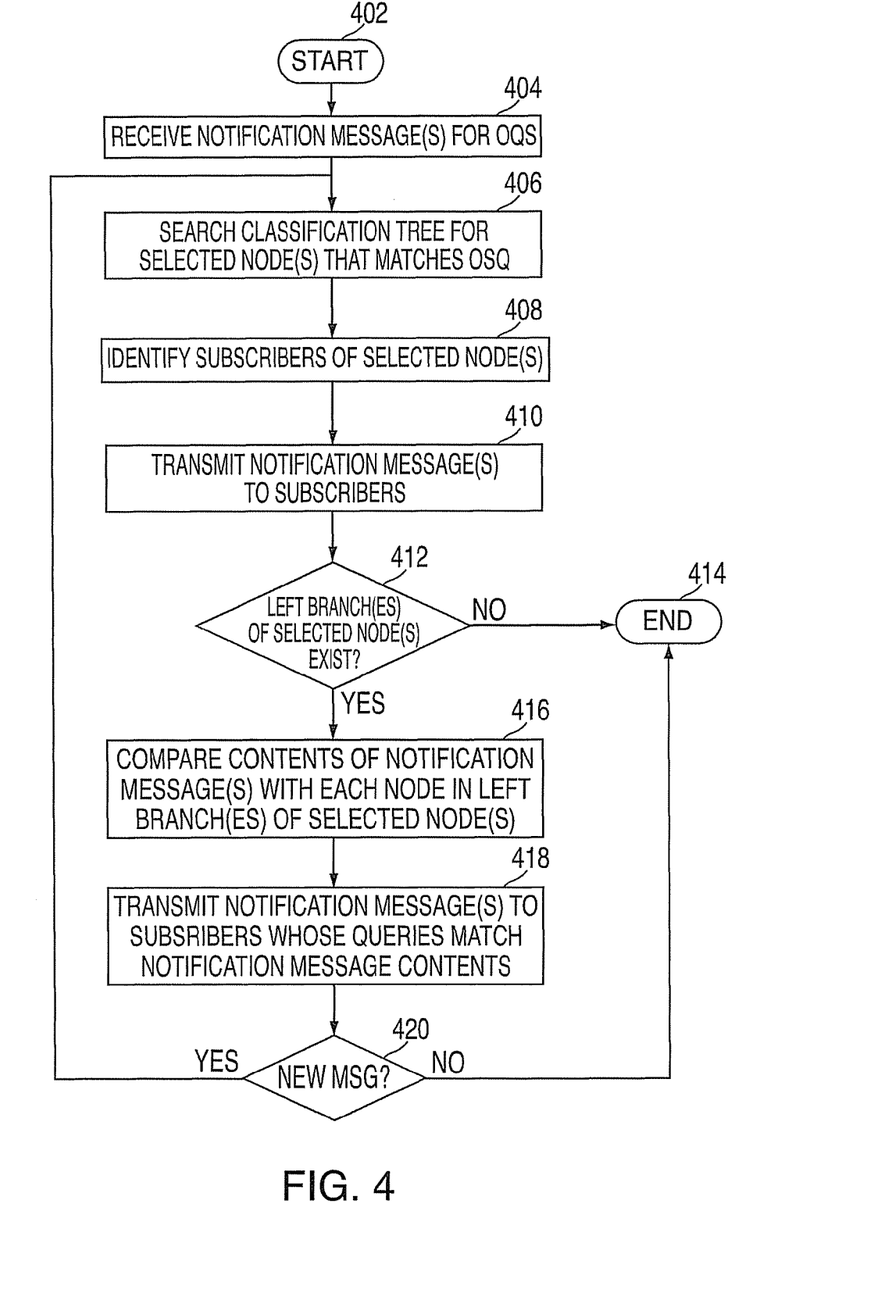
FIG. 4 is a flow diagram describing a process for responding to notification messages resulting from execution of the optimal subscription query in exemplary embodiments.

The process begins at step 402 whereby one or more notification messages are received at the notification broker system 104 from the notification service provider system 108 in response to execution of an optimal query subscription at step 404. At step 406, the classification tree 300 is searched for the selected node(s) that match the optimal subscription query. The classification tree 300 may be searched, e.g., via a depth first recursive tree search that visits the left branch as long as it meets the criteria to include the message in its result set.

Once found, the subscriber client systems associated with the selected node(s) (e.g., via internal records established at the subscriber accounts) are identified at step 408. A notification message is transmitted to the identified subscriber client systems 102 at step 410.

At step 412, it is determined whether any left branch(es) exist for the selected node(s). If not, the process ends at step 414. Otherwise, the contents of the notification message are compared with each node in the left branch(es) of the selected node(s) in order to determine whether any matches exist at step 416.

A notification message is transmitted to subscriber client systems 102 whose subscription queries match the contents of the notification message at step 418.

At step 420, it is determined whether a new notification message has been received. If not, the process ends at step 414. Otherwise, the process returns to step 406 as shown in the flow diagram of FIG. 4 and as described above.

As described above, embodiments can be embodied in the form of computer-implemented processes and apparatuses for practicing those processes. In exemplary embodiments, the invention is embodied in computer-readable program code on a computer-usable medium executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer implemented method for optimizing query evaluation and processing services in a subscription notification system to reduce query redundancy at a notification service provider system of the subscription notification system, comprising:
   receiving a set of subscription queries at a notification broker system from subscription client systems, the notification broker system comprising processing circuitry and acting as an intermediary between the subscription client systems and the notification service provider system;
   as the subscription queries are received from subscription client systems at the notification broker system, generating a classification tree by analyzing the subscription queries to determine hierarchical relationships among the subscription queries and to identify subscription queries that are subsets of corresponding other subscription queries;
   selecting one of the nodes in the classification tree as the basis for an optimal subscription query, the selection based upon a minimum number of relevant messages expected to be obtained via execution of the selection;
   generating the optimal subscription query from selected node, the optimal subscription query including all query elements from the selected node and all of the query elements from child nodes of the selected node;
   subscribing the notification broker system to the notification service provider system with the optimal subscription query;
   receiving at least one notification message from the notification service provider system in response to the optimal subscription query from the notification broker system; and
   identifying subscription client systems for transmitting the at least one notification message resulting from execution of the optimal subscription query by identifying the one or more selected nodes that match the optimal subscription query for which the at least one notification message is generated, and
   transmitting the at least one notification message to subscriber client systems associated with the one or more selected nodes.

2. The method of claim 1, wherein the determining hierarchical relationships further comprises generating a classification tree for a subject, the classification tree specifying subset relationships among the set of subscription queries via hierarchical levels and nodes; wherein each node in a left branch of a parent node at a specified level in the classification tree is a subset of the parent node; and wherein further, subscription queries that are not classified as either of a subset and a superset of the parent node are placed in an empty leaf node by traversing the classification tree for a first available empty leaf node.

3. The method of claim 2, further comprising:
   inserting a new node at the top of the classification tree, upon receipt of a subscription query, when the subscription query is determined to be a superset of a highest node in the classification tree;
   attaching the highest node to the new node as a left branch; and
   attaching the right branch of the highest node, if existing, to the new node as a right branch.

4. The method of claim 2, wherein each of the nodes in the classification tree is associated with at least one of the subscription client systems based upon respective subscription queries.

5. The method of claim 2, further comprising:
processing the left branch of the one or more selected nodes, comprising:
comparing contents of the at least one notification message to each of the subscription queries in each of the nodes of the left branch; and
transmitting the at least one notification message to those subscription client systems associated with any of the nodes of the left branch for which a match is found in response to the comparing.

6. A system for optimizing query evaluation and processing services to reduce query redundancy at a notification service provider system of the system, comprising:
a notification broker system comprising processing circuitry, the notification broker system in communication with subscription client systems and the notification service provider system, the notification broker system acting as an intermediary between the subscription client systems and the notification service provider system; and
a query optimization application executing on the notification broker system, the query optimization application stored on a non-transitory computer-readable storage medium and implementing a method, comprising:
determining hierarchical relationships among a set of subscription queries received from the subscription client systems, as the subscription queries are received, and generating a classification tree by analyzing the subscription queries;
selecting one of the nodes in the classification tree as the basis for an optimal subscription query, the selection based on a predefined policy that describes at least one of an ability of the notification service provider system to service subscriptions, an ability of the notification broker system to service subscriptions, and a cost of sending a notification from the notification service provider system to the notification broker system;
generating at least one optimal subscription query to include all query elements from the selected node and all of the query elements from child nodes of the selected node;
subscribing the notification broker system to the notification service provider system with at least one optimal subscription query;
receiving at least one notification message from the notification service provider system in response to the at least one optimal subscription query from the notification broker system; and
transmitting the at least one notification message to subscriber client subset and a superset of the parent node are placed in an empty leaf node by traversing the classification tree for a first available empty leaf node.

7. The system of claim 6, wherein the determining further comprises generating a classification tree for a subject, the classification tree specifying subset relationships among the set of subscription queries via hierarchical levels and nodes; wherein each node in a left branch of a parent node at a specified level in the classification tree is a subset of the parent node; and wherein further, subscription queries that are not classified as either of a subset and a superset of the parent node are placed in an empty leaf node by traversing the classification tree for a first available empty leaf node.

8. The system of claim 6, wherein the at least one optimal subscription query is created from one or more selected nodes in the classification tree.

9. The system of claim 7, wherein the query optimization application further performs:
processing the left branch of the one or more selected nodes, comprising:
comparing contents of the at least one notification message to each of the subscription queries in each of the nodes of the left branch; and
transmitting the at least one notification message to those subscription client systems associated with any of the nodes of the left branch for which a match is found in response to the comparing.

10. A computer program product for optimizing query evaluation and processing services in a subscription notification system, the computer program product including a computer-readable program of instructions on a non-transitory computer-readable storage medium for implementing a method, comprising:
receiving a set of subscription queries at a notification broker system from subscription client systems, the notification broker system comprising processing circuitry and acting as an intermediary between the subscription client systems and a notification service provider system;
determining hierarchical relationships among the set of subscription queries received from subscription client systems at the notification broker system, and generating a classification tree by analyzing the subscription queries to identify subscription queries that are subsets of corresponding other subscription queries;
selecting one of the nodes in the classification tree as the basis for an optimal subscription query, the selection based on a predefined policy that describes at least one of an ability of the notification service provider system to service subscriptions, an ability of the notification broker system to service subscriptions, and a cost of sending a notification from the notification service provider system to the notification broker system;
generating, from a corresponding subscription query identified by the node, at least one optimal subscription query to include all query elements from the selected node and all of the query elements from child nodes of the selected node; subscribing the notification broker system to the notification service provider system with at least one optimal subscription query;
receiving at least one notification message from the notification service provider system in response to the at least one optimal subscription query from the notification broker system; and
identifying subscription client systems for transmitting the at least one notification message resulting from execution of the at least one optimal subscription query by searching a classification tree for the one or more selected nodes that match the at least one optimal subscription query for which the at least one notification message is generated, and
transmitting the at least one notification message to subscriber client systems associated with the one or more selected nodes.

11. The computer program product of claim 10, wherein the determining further comprises generating a classification tree for a subject, the classification tree specifying subset relationships among the set of subscription queries via hierarchical levels and nodes; wherein each node in a left branch of a parent node at a specified level in the classification tree is a subset of the parent node; and wherein further, subscription queries that are not classified as either of a subset and a superset of the parent node are placed in an empty leaf node by traversing the classification tree for a first available empty leaf node.

12. The computer program product of claim 11, wherein each of the nodes in the classification tree is associated with at least one of the subscription client systems based upon respective subscription queries.

13. The computer program product of claim 11, further comprising instructions for implementing:
   processing the left branch of the one or more selected nodes, comprising:
      comparing contents of the at least one notification message to each of the subscription queries in each of the nodes of the left branch; and
      transmitting the at least one notification message to those subscription client systems associated with any of the nodes of the left branch for which a match is found in response to the comparing.

14. The system of claim 6, wherein the selecting one of the nodes in the classification tree based on a predefined policy selects the one of the nodes based upon a minimum number of relevant messages expected to be obtained via execution of the selection.

15. The method of claim 1, wherein the selecting one of the nodes in the classification tree further comprises selecting based on a predefined policy.

16. The method of claim 15, wherein the predefined policy describes at least one of an ability of the notification service provider system to service subscriptions, an ability of the notification broker system to service subscriptions, and a cost of sending a notification from the notification service provider system to the notification broker system.

17. The computer program product of claim 10, wherein the selecting one of the nodes in the classification tree selects the one of the nodes based upon a minimum number of relevant messages expected to be obtained via execution of the selection.

* * * * *